United States Patent
Lin et al.

(10) Patent No.: US 12,206,811 B2
(45) Date of Patent: Jan. 21, 2025

(54) MOBILE TERMINAL AND SOUND OUTPUT CONTROL METHOD

(71) Applicant: VIVO MOBILE COMMUNICATION CO., LTD., Guangdong (CN)

(72) Inventors: Hanzhong Lin, Guangdong (CN); Junhui Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 343 days.

(21) Appl. No.: 17/458,686

(22) Filed: Aug. 27, 2021

(65) Prior Publication Data

US 2021/0392221 A1    Dec. 16, 2021

Related U.S. Application Data

(63) Continuation of application No. PCT/CN2020/076144, filed on Feb. 21, 2020.

(30) Foreign Application Priority Data

Feb. 28, 2019   (CN) .......................... 201910151709.4

(51) Int. Cl.
| | |
|---|---|
| H04M 1/60 | (2006.01) |
| G06F 3/16 | (2006.01) |
| H04M 1/72454 | (2021.01) |
| H04R 3/00 | (2006.01) |
| H04R 5/04 | (2006.01) |

(52) U.S. Cl.
CPC ............ *H04M 1/605* (2013.01); *G06F 3/165* (2013.01); *H04M 1/72454* (2021.01); *H04R 3/005* (2013.01); *H04R 5/04* (2013.01)

(58) Field of Classification Search
None
See application file for complete search history.

(56) References Cited

U.S. PATENT DOCUMENTS

| | | | |
|---|---|---|---|
| 8,918,146 B2 | 12/2014 | Khawand | |
| 2009/0137268 A1 | 5/2009 | Fukazawa et al. | |
| 2009/0143115 A1 | 6/2009 | Chen | |
| 2009/0215439 A1* | 8/2009 | Hamilton | H04M 1/605 |
| | | | 455/418 |
| 2010/0159998 A1* | 6/2010 | Luke | H04M 1/72448 |
| | | | 455/575.1 |

(Continued)

FOREIGN PATENT DOCUMENTS

| | | |
|---|---|---|
| CN | 101453846 A | 6/2009 |
| CN | 104113614 A | 10/2014 |

(Continued)

OTHER PUBLICATIONS

CN 108804071 English Translation (Year: 2023).*
CN 109195082 English Translation (Year: 2023).*
Translation of CN109040384 (Year: 2024).*

*Primary Examiner* — Gennadiy Tsvey
(74) *Attorney, Agent, or Firm* — Price Heneveld LLP (57) ABSTRACT

This disclosure provides a mobile terminal and a sound output control method. The mobile terminal includes: a display screen; a strip-shaped sound output hole, disposed at a top edge of the display screen; and at least two phone receivers, each of which is connected to the sound output hole by a sound conduction channel, where at least one phone receiver is disposed adjacently to a first end of the sound output hole, and at least one phone receiver is disposed adjacently to a second end of the sound output hole.

14 Claims, 3 Drawing Sheets

(56) References Cited

U.S. PATENT DOCUMENTS

| | | | |
|---|---|---|---|
| 2012/0086551 A1* | 4/2012 | Lowe | H04M 1/6058 340/6.1 |
| 2013/0095886 A1* | 4/2013 | Hong | H04M 1/724 455/556.1 |
| 2013/0260839 A1* | 10/2013 | Moquin | H04M 1/605 455/569.1 |
| 2014/0079231 A1* | 3/2014 | Yu | H04R 1/02 381/59 |
| 2014/0308910 A1 | 10/2014 | Tsai | |
| 2015/0205400 A1 | 7/2015 | Dwang et al. | |
| 2016/0029117 A1* | 1/2016 | Suvanto | H04R 1/326 381/337 |
| 2016/0191097 A1* | 6/2016 | Huh | H04R 1/025 455/575.1 |
| 2018/0278735 A1 | 9/2018 | Zheng et al. | |

FOREIGN PATENT DOCUMENTS

| | | | | |
|---|---|---|---|---|
| CN | 104717351 A | | 6/2015 | |
| CN | 106131273 A | | 11/2016 | |
| CN | 106131759 A | | 11/2016 | |
| CN | 106973170 A | | 7/2017 | |
| CN | 108804071 A | | 11/2018 | |
| CN | 109040384 A | * | 12/2018 | H04M 1/026 |
| CN | 109121047 A | | 1/2019 | |
| CN | 109195082 A | | 1/2019 | |
| CN | 109951582 A | | 6/2019 | |
| JP | 2006279260 A | | 10/2006 | |
| JP | 2017510868 A | | 4/2017 | |
| KR | 20090100194 A | | 9/2009 | |
| KR | 20150082032 A | | 7/2015 | |

\* cited by examiner

MOBILE TERMINAL AND SOUND OUTPUT CONTROL METHOD

CROSS-REFERENCE TO RELATED APPLICATIONS

This application is a continuation application of PCT Application No. PCT/CN2020/076144 filed on Feb. 21, 2020, which claims priority to Chinese Patent Application No. 201910151709.4 filed in China on Feb. 28, 2019, disclosures of which are incorporated herein by reference in their entireties.

TECHNICAL FIELD

This disclosure relates to the field of communications technologies, and in particular, to a mobile terminal and a sound output control method.

BACKGROUND

With development of mobile terminal technologies, mobile terminals designed with full screens, water drop screens, double-sided screens, and the like also come into people's vision. To pursue an ultimate appearance, a phone receiver (or earpiece) of a mobile terminal is also gradually designed to output sound through a micro-slit or a narrow slit. For example, a camera of the mobile terminal is disposed in the top center of the display screen of the mobile terminal (such as a water drop screen), a sound output hole is disposed in a form of a narrow slit or a micro-slit in a position near the camera in the top center of the mobile terminal, and the phone receiver is disposed at one end of the sound output hole of the mobile terminal (that is, the phone receiver is located in a left/right position of the camera). In this case, the phone receiver is not in the top center of the mobile terminal. Consequently, when a user holds the mobile terminal with different holding postures to perform a call operation, the user's ear is likely to block the sound output hole on one side corresponding to the phone receiver when the user holds the phone to one side. As a result, volume of sound heard by the user's ear decreases, and even the sound is distorted (there is a noise or tremolo problem), but when the user holds the phone to on the other side, volume and sound quality are normal.

In other words, in the related art, because the mobile terminal is designed to output sound from the phone receiver through the micro-slit or the narrow slit, that is, because the phone receiver is not in the top center of the mobile terminal, and the user's earlobe is likely to block the sound output hole on the side corresponding to the phone receiver and cause the volume to decrease or the sound quality to deteriorate.

SUMMARY

According to a first aspect, an embodiment of this disclosure provides a mobile terminal. The mobile terminal includes:
 a display screen;
 a strip-shaped sound output hole, disposed at a top edge of the display screen; and
 at least two phone receivers, each of which is connected to the sound output hole by a sound conduction channel, where at least one phone receiver is disposed adjacently to a first end of the sound output hole, and at least one phone receiver is disposed adjacently to a second end of the sound output hole.

According to a second aspect, an embodiment of this disclosure provides a sound output control method, applied to the foregoing mobile terminal. The control method includes:
 monitoring a current working state of the mobile terminal; and
 in a case of detecting that the current working state meets a preset condition for enabling sound output of at least two phone receivers, determining a target phone receiver from the at least two phone receivers, and controlling the target phone receiver to enable a sound output function, where
 the current working state includes a preset event start state.

According to a third aspect, an embodiment of this disclosure provides a mobile terminal, where the mobile terminal is the foregoing mobile terminal. The mobile terminal includes:
 a monitoring module, configured to monitor a current working state of the mobile terminal; and
 a first control module, configured to: in a case of detecting that the current working state meets a preset condition for enabling sound output of at least two phone receivers, determine a target phone receiver from the at least two phone receivers, and control the target phone receiver to enable a sound output function, where
 the current working state includes a preset event start state.

According to a fourth aspect, an embodiment of this disclosure provides a mobile terminal, including a processor, a memory, and a computer program stored in the memory and capable of running on the processor. When the computer program is executed by the processor, steps of the foregoing sound output control method are implemented.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

Figure 1:
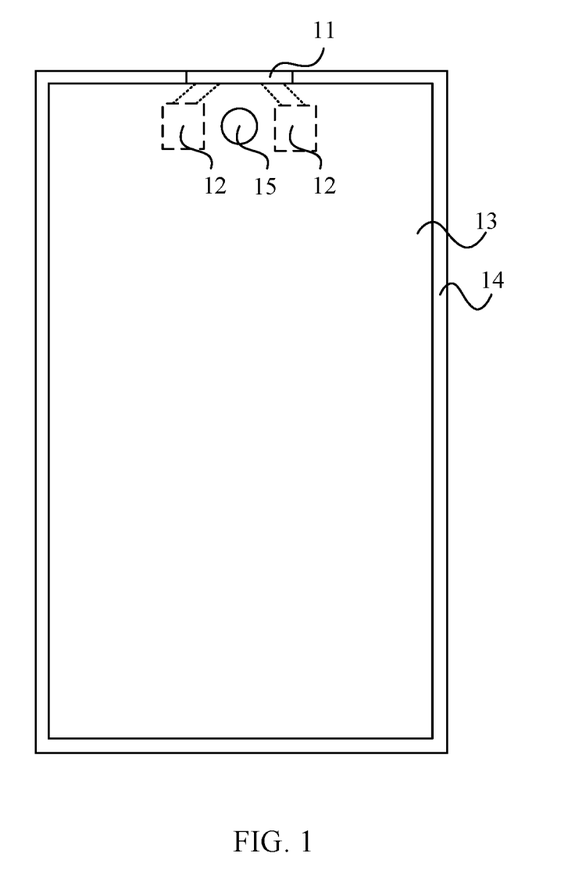
FIG. 1 presents a first schematic structural diagram of a mobile terminal according to an embodiment of this disclosure.

FIG. 1 is a first schematic structural diagram of a mobile terminal according to an embodiment of this disclosure.

An embodiment of this disclosure provides a mobile terminal. The mobile terminal may include:

a display screen 13;

a strip-shaped sound output hole 11, disposed at a top edge of the display screen 13; and at least two phone receivers 12, each of which is connected to the sound output hole 11 by a sound conduction channel, where at least one phone receiver 12 is disposed adjacently to a first end of the sound output hole 11, and at least one phone receiver 12 is disposed adjacently to a second end of the sound output hole 11.

In this embodiment of this disclosure, the two ends of the sound output hole 11 are the first end and the second end respectively, and at least two phone receivers 12 are arranged at the two ends of the sound output hole 11, that is, at least one phone receiver 12 is disposed adjacently to the first end of the sound output hole 11, and at least one phone receiver 12 is disposed adjacently to the second end of the sound output hole 11. Each of the at least two phone receivers 12 is connected to the sound output hole 11 by the sound conduction channel, so that sound generated by the at least two phone receivers 12 can be output through the sound output hole 11. Therefore, a corresponding phone receiver 12 can be selected from the at least two phone receivers 12 based on an actual requirement, and used to output sound. This can avoid a problem that a user's earlobe blocks the sound output hole on one side and causes volume to decrease or even sound quality to deteriorate.

In some optional embodiments of this disclosure, the mobile terminal may further include a frame 14 that surrounds the display screen 13, and the sound output hole 11 may be disposed between the top edge of the display screen 13 and the frame 14, and is located in the middle of the top edge.

In some optional embodiments of this disclosure, the mobile terminal may further include a photosensitive module 15, where the photosensitive module 15 may be located between disposition positions of the at least two phone receivers 12, that is, the at least two phone receivers 12 may surround the photosensitive module 15, and the photosensitive module 15 may be at least one of a camera module or a facial recognition module.

Advantageously, in this embodiment of this disclosure, considering design costs and a limitation of structural disposition space, as shown in FIG. 1, a quantity of the at least two phone receivers 12 may be two, and one phone receiver 12 is disposed adjacently to each of the two ends of the sound output hole 11. Further, in an example, the two phone receivers 12 may be symmetrically disposed around two sides of the photosensitive module 15.

In addition, in some optional embodiments of this disclosure, there may be two display screens 13, and the two display screens 13 are disposed facing away from each other; there may be two sound output holes 11, one sound output hole 11 is disposed for each display screen 13, and the at least two phone receivers 12 are respectively connected to each sound output hole 11 by a sound conduction channel. In this embodiment of this disclosure, the two display screens 13 disposed facing away from each other are respectively provided with one sound output hole 11, the two sound output holes 11 are disposed in opposite positions, each sound output hole 11 is disposed at a top edge of a corresponding display screen 13, and at least one phone receiver 12 is disposed adjacently to each of the two ends of each sound output hole 11. In this way, for the display screen 13 on any side, a corresponding phone receiver 12 can be selected from the at least two phone receivers 12 based on an actual requirement and used to output sound. This can avoid the problem that the user's earlobe blocks the sound output hole on one side and causes volume to decrease or even sound quality to deteriorate. Optionally, the quantity of the at least two phone receivers 12 is two, that is, the two sound output holes 11 share two phone receivers 12.

In this embodiment of this disclosure, a baffle is disposed on each sound conduction channel between each sound output hole 11 and the at least two phone receivers 12. When the baffle is in a first position, the sound conduction channel is opened. When the baffle is in a second position, the sound conduction channel is closed. In this way, when the corresponding sound output hole 11 is required to output sound, the position of the baffle can be switched to cause the sound conduction channel corresponding to the corresponding sound output hole 11 to be opened or closed. Therefore, the required sound output hole 11 outputs sound, while the sound output hole 11 that is not required does not output sound.

In the mobile terminal provided by this embodiment of this disclosure, at least two phone receivers are disposed, where at least one phone receiver is disposed adjacently to the first end of the sound output hole, and at least one phone receiver is disposed adjacently to the second end of the sound output hole. Therefore, a corresponding phone receiver can be selected from the at least two phone receivers based on an actual requirement, and used to output sound. This can avoid the problem that the user's earlobe blocks the sound output hole on one side and causes volume to decrease or sound quality to deteriorate.

Figure 2:
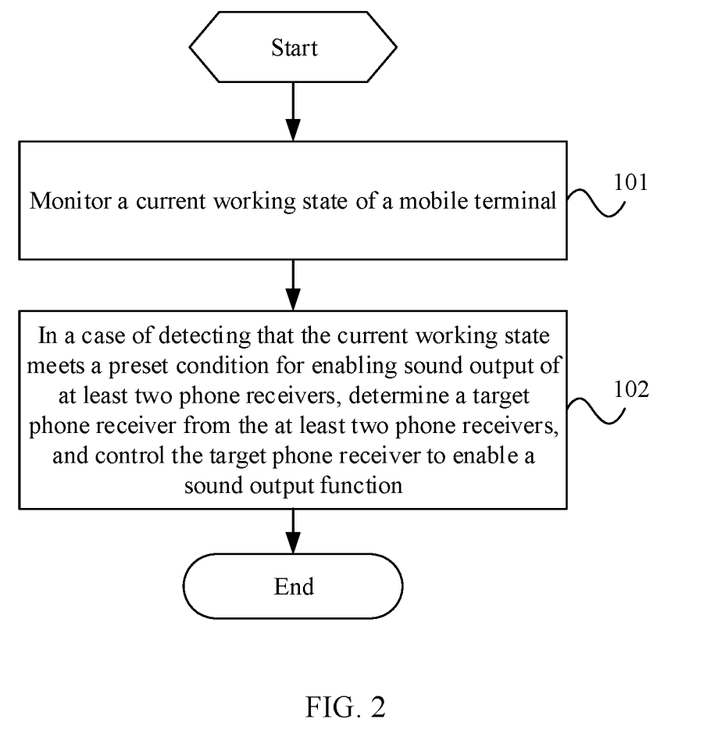
FIG. 2 presents a schematic flowchart of a sound output control method according to an embodiment of this disclosure.

FIG. 2 is a schematic flowchart of a sound output control method according to an embodiment of this disclosure. This embodiment of this disclosure provides a sound output control method, applied to the foregoing mobile terminal. The control method may include the following steps.

Step 101: Monitor a current working state of the mobile terminal.

In this step, during use of the mobile terminal, the mobile terminal monitors the current working state of the mobile terminal to determine whether the mobile terminal currently meets a preset condition for enabling sound output of at least two phone receivers, to prepare for subsequent steps. The current working state includes a preset event start state. In this step, the preset event start state is specifically monitored, and whether the preset event start state meets the preset start condition is determined. The preset event may be a voice call event or another event of outputting a voice through a phone receiver.

Step 102: In a case of detecting that the current working state meets the preset condition for enabling sound output of the at least two phone receivers, determine a target phone receiver from the at least two phone receivers, and control the target phone receiver to enable a sound output function.

In this step, whether the current working state meets the preset start condition is determined based on the current working state monitored in step 101. In the case of detecting that the current working state of the mobile terminal meets the preset start condition, the target phone receiver for outputting sound is determined from the at least two phone receivers. Specifically, the at least two phone receivers may be directly determined as target phone receivers; or based on a holding posture of the mobile terminal, at least one phone receiver corresponding to the holding posture is determined as the target phone receiver, and then the target phone receiver is controlled to enable the sound output function to output an audio. Therefore, a corresponding phone receiver can be selected from the at least two phone receivers based on an actual requirement, and used to output sound. This can avoid a problem that a user's earlobe blocks the sound output hole on one side and causes volume to decrease or even sound quality to deteriorate.

In this embodiment of this disclosure, in the case of detecting that the current working state of the mobile terminal meets the preset condition for enabling sound output of the at least two phone receivers, the target phone receiver is determined from the at least two phone receivers, and the target phone receiver is controlled to enable the sound output function, so that blocking of the sound output hole on one side does not affect sound output quality during the sound output of the phone receiver, and that the problem that the volume decreases or even the sound quality deteriorates can be avoided.

In some optional embodiments of this disclosure, in step 102, the determining a target phone receiver from the at least two phone receivers in a case of detecting that the current working state meets the preset condition for enabling sound output of the at least two phone receivers may include the following step: detecting the holding posture of the mobile terminal; and determining the target phone receiver from the at least two phone receivers based on a correspondence between the holding posture and the target phone receiver. In this embodiment of this disclosure, the correspondence between the holding posture of the mobile terminal and the target phone receiver for performing sound output may be preset. In this way, by detecting the holding posture of the mobile terminal, at least one phone receiver corresponding to the holding posture may be determined from the at least two phone receivers as the target phone receiver, and further, the target phone receiver is controlled to enable the sound output function for outputting the audio, so that the holding posture of the user cannot affect the audio output of the mobile terminal, that is, blocking of the sound output hole on one side does not affect sound output quality during the sound output of the phone receiver, and the problem that the volume decreases or even the sound quality deteriorates is avoided.

In this embodiment of this disclosure, a plurality of manners may be used to detect the holding posture of the mobile terminal.

For example, in some optional embodiments, a gravity detection module, such as a gravity sensor or a gyroscope, may be configured on the mobile terminal, and then a three-dimensional rectangular coordinate system is established in advance. Using a plane parallel to a plane of the display screen as an x-y axis plane, and using a direction perpendicular to a direction of the plane of the display screen as a z-axis, a corresponding three-dimensional rectangular coordinate system is established, and a long-side direction of the mobile terminal in the three-dimensional rectangular coordinate system is marked in advance. A tilt angle between the long-side direction of the mobile terminal and a horizontal plane is detected by using the gravity detection module. Then it is determined, based on the detected tilt angle, that the holding posture of the mobile terminal is a right-hand holding posture or a left-hand holding posture. To be specific, if the tilt angle between the long-side direction and the horizontal plane is within a first angle range, it is determined that the holding posture of the mobile terminal is the right-hand holding posture; or if the tilt angle between the long-side direction and the horizontal plane is within a second angle range, it is determined that the holding posture of the mobile terminal is the left-hand holding posture.

Alternatively, in other optional embodiments, a sensor, such as a capacitive sensor or a pressure sensor, may be configured on the frame of the mobile terminal, and the sensor is used to obtain a finger holding position in which the mobile terminal is held, to determine distribution of the finger holding position of the user. Because distribution of finger holding positions of the user in the right-hand holding posture and the left-hand holding posture is different, it can be determined, based on the distribution of the holding position, that the holding posture of the mobile terminal is the right-hand holding posture or the left-hand holding posture.

Alternatively, in other optional embodiments, a camera of the mobile terminal may be started to obtain a current shape of the user's ear photographed by the camera, and the current shape is compared with at least two prestored preset shapes, where each preset shape matches a holding posture; and a holding posture corresponding to the current shape is determined.

Further, the target phone receiver corresponding to the holding posture may also be determined in a plurality of manners.

For example, in some optional embodiments of this disclosure, phone receiver numbers may be preset for the at least two phone receivers, and a correspondence between the holding postures of the mobile terminal and the phone receiver numbers is set. Then in the corresponding holding posture, at least one phone receiver corresponding to the holding posture may be determined from the at least two phone receivers based on a phone receiver number, and determined as the target phone receiver. In other words, the determining the target phone receiver from the at least two phone receivers based on a correspondence between the holding posture and the target phone receiver may include: determining, based on a preset correspondence between the holding posture of the mobile terminal and the phone receiver number, the target phone receiver number corresponding to the holding posture, and determining the target phone receiver based on the target phone receiver number.

Alternatively, in some optional embodiments of this disclosure, a correspondence between the holding postures and the two ends of the sound output hole may be preset, and then a target end corresponding to the sound output hole is determined based on the holding posture, so that at least one phone receiver corresponding to the target end is determined from the at least two phone receivers as the target phone receiver. In other words, the determining the target phone receiver from the at least two phone receivers based on a correspondence between the holding posture and the target phone receiver includes: determining, based on the holding posture, a first target end of the sound output hole corresponding to the holding posture; and determining at least one phone receiver adjacent to the first target end as the target phone receiver.

The first target end of the sound output hole corresponding to the holding posture may be determined in a plurality of manners.

In an example, numbers may be preset for the two ends of the sound output hole, and a correspondence between the holding posture of the mobile terminal and a number of each end of the sound output hole is set. Then in the corresponding holding posture, the first target end corresponding to the holding posture is determined based on the number of each end of the sound output hole, and further, the target phone receiver is determined from the at least two phone receivers. In other words, the determining, based on the holding posture, a first target end of the sound output hole corresponding to the holding posture may include: determining, based on the correspondence between the holding posture and the prestored number of each end of the sound output hole, the first target end of the sound output hole corresponding to the holding posture.

Alternatively, in another example, the sensor may be used to obtain the finger holding position in which the mobile terminal is held, to determine the distribution of the finger holding position of the user; and then a thumb holding position of the user's thumb is determined based on the distribution of the holding position, one end of the sound output hole further away from the user's thumb is determined as the first target end corresponding to the holding posture, and further, the target phone receiver is determined from the at least two phone receivers. In other words, the determining, based on the holding posture, a first target end of the sound output hole corresponding to the holding posture may include: determining the thumb holding position of the user's thumb on the mobile terminal; and determining one end of the sound output hole further away from the thumb holding position as the first target end.

Alternatively, in another example, the camera may be used to obtain the current shape of the user's ear, and then a pinna position is determined based on the current shape of the user's ear. Therefore, the first target end of the sound output hole corresponding to the pinna position is determined based on a correspondence between the pinna position and the target end of the sound output hole, and further, the target phone receiver is determined from the at least two phone receivers. In other words, the determining, based on the holding posture, a first target end of the sound output hole corresponding to the holding posture may include: determining the pinna position of the user's ear; and determining one end of the sound output hole further away from the pinna position as the first target end.

In this embodiment of this disclosure, in actual use, the foregoing manners of detecting the holding posture of the mobile terminal may be used separately alone or used in combination based on a specific use requirement. Likewise, the foregoing manners of determining the target phone receiver may also be used separately alone or used in combination.

In addition, in some optional embodiments of this disclosure, two such display screens are provided, and the two display screens are disposed facing away from each other; and two such sound output holes are provided, each display screen is provided with one such sound output hole, and the at least two phone receivers are separately connected to each sound output hole by a sound conduction channel. In this case, the determining a target phone receiver from the at least two phone receivers in a case of detecting that the current working state meets the preset condition for enabling sound output of the at least two phone receivers in step 102 may include the following steps: determining a display screen close to the user's ear as a target display screen; and determining the target phone receiver from the at least two phone receivers based on the target display screen and the holding posture of the mobile terminal. In this embodiment of this disclosure, when the mobile terminal has two display screens disposed facing away from each other, and two sound output holes are disposed in a one-to-one correspondence to the two display screens, a target display screen close to the user's ear, that is, a display screen used by the user, may be determined from the two display screens; and then the target phone receiver is determined from the at least two phone receivers based on the target display screen and the holding posture of the mobile terminal, and further, the target phone receiver is controlled to enable the sound output function for outputting the audio, so that the audio output of the mobile terminal cannot be affected by the holding posture of the user, that is, blocking of the sound output hole on one side does not affect sound output quality during the sound output of the phone receiver, and the problem that the volume decreases or even the sound quality deteriorates is avoided. For determining the target display screen, a proximity sensor (for example, an infrared proximity sensor) may be used to determine a display screen whose distance from the user's ear is less than a preset value as the target display screen.

Specifically, in this embodiment of this disclosure, after the target display screen is determined, the tilt angle between the long-side direction of the mobile terminal and the horizontal plane, detected by using the gravity detection module, may be determined. Then it is determined, based on the detected tilt angle, that the holding posture of the mobile terminal is the right-hand holding posture or the left-hand holding posture. Alternatively, the sensor may be used to obtain the finger holding posture in which the mobile terminal is held, to determine the distribution of the finger holding position of the user, and determine, based on the distribution of the holding position, whether the holding posture of the mobile terminal is the right-hand holding posture or the left-hand holding posture; and then phone receiver numbers may be preset for the at least two phone receivers, at least one phone receiver corresponding to the target display screen and the holding posture is determined from the at least two phone receivers based on the phone receiver number as the target phone receiver. In other words, the determining the target phone receiver from the at least two phone receivers based on the target display screen and the holding posture of the mobile terminal may include: determining, based on a preset correspondence between the target display screen and the holding posture and a phone receiver number, the target phone receiver number corresponding to the target display screen and the holding posture, and determining the target phone receiver based on the target phone receiver number.

In addition, in some optional embodiments, the determining the target phone receiver from the at least two phone receivers based on the target display screen and the holding posture of the mobile terminal may include the following steps: determining a corresponding sound output hole on the target display screen as a target sound output hole; determining, based on the holding posture, a second target end of the target sound output hole corresponding to the holding posture; and determining at least one phone receiver adjacent to the second target end as the target phone receiver. In this embodiment of this disclosure, the sound output hole on the target display screen, that is, a sound output hole actually used by the user, is determined as the target sound output hole, then the second target end corresponding to the target sound output hole is determined based on the holding posture, and further, the target phone receiver corresponding to the second target end is determined from the at least two phone receivers. In this way, the target phone receiver appropriate to the holding posture of the mobile terminal can be determined based on the sound output hole actually used by the user, so that the audio output of the mobile terminal is not affected by the holding posture of the user, that is, blocking of the sound output hole on one side does not affect sound output quality during the sound output of the phone receiver, and the problem that the volume decreases or even the sound quality deteriorates is avoided.

Specifically, in this embodiment of this disclosure, after the target sound output hole is determined, numbers may be preset for the two ends of the sound output hole, and the correspondence between the holding posture of the mobile terminal and the number of each end of the sound output hole may be set. Then in the corresponding holding posture, the second target end of the target sound output hole corresponding to the holding posture is determined based on the number of each end of the sound output hole, and further, the target phone receiver is determined from the at least two phone receivers. In other words, the determining, based on the holding posture, a second target end of the target sound output hole corresponding to the holding posture may include: determining, based on the correspondence between the holding posture and the prestored number of each end of the sound output hole, the second target end of the target sound output hole corresponding to the holding posture. Alternatively, after the target sound output hole is determined, the sensor may be used to obtain the finger holding position in which the mobile terminal is held, to determine the distribution of the finger holding position of the user; and then the thumb holding position of the user's thumb is determined based on the distribution of the holding position, one end of the target sound output hole further away from the user's thumb is determined as the second target end corresponding to the holding posture, and further, the target phone receiver is determined from the at least two phone receivers. In other words, the determining, based on the holding posture, a second target end of the target sound output hole corresponding to the holding posture may include: determining the thumb holding position of the user's thumb on the mobile terminal; and determining one end of the target sound output hole further away from the thumb holding position as the second target end. Alternatively, after the target sound output hole is determined, the camera may be used to obtain the current shape of the user's ear, and then the pinna position of the user's ear is determined based on the current shape of the user's ear. Therefore, the second target end of the target sound output hole corresponding to the pinna position is determined based on the correspondence between the pinna position and the target end of the sound output hole, and further, the target phone receiver is determined from the at least two phone receivers. In other words, the determining, based on the holding posture, a second target end of the target sound output hole corresponding to the holding posture may include: determining the pinna position of the user's ear; and determining one end of the target sound output hole further away from the pinna position as the second target end.

In addition, in some optional embodiments of this disclosure, in step 102, after the determining a target phone receiver from the at least two phone receivers, and controlling the target phone receiver to enable a sound output function in a case of detecting that the current working state meets the preset condition for enabling sound output of the at least two phone receivers, the method may further include: controlling a sound conduction channel between the target phone receiver and the target sound output hole to be opened, and controlling a sound conduction channel between the target phone receiver and a sound output hole other than the target sound output hole to be closed. In this embodiment of this disclosure, the currently used target sound output hole may be determined, and then the corresponding sound conduction channel is opened. In this way, a problem that the sound quality deteriorates due to sound dispersion caused by simultaneous sound output of two sound output holes can be avoided.

In addition, in some optional embodiments of this disclosure, in step 102, the determining a target phone receiver from the at least two phone receivers, and controlling the target phone receiver to enable a sound output function in a case of detecting that the current working state meets the preset condition for enabling sound output of the at least two phone receivers may include: determining the at least two phone receivers as target phone receivers; and controlling the target phone receiver to enable the sound output function, and reducing output volume of the target phone receiver. In this embodiment of this disclosure, in a case in which the current working state meets the preset condition for enabling sound output of the at least two phone receivers, the at least two phone receivers may be directly determined as the target phone receivers. In this case, the output volume of the target phone receiver may be adjusted to lower volume while the target phone receiver is controlled to enable the sound output function for outputting the audio, to avoid excessively high output volume. In this way, user privacy is ensured, while a level of sound leakage is taken into account.

Specifically, in some optional embodiments of this disclosure, the reducing output volume of the target phone receiver may include: obtaining a distance between the user's ear and the display screen of the mobile terminal; determining, based on a preset correspondence between the distance and a volume adjustment ratio, the volume adjustment ratio corresponding to the distance; and reducing the output volume of the target phone receiver based on the volume adjustment ratio. In this embodiment of this disclosure, the correspondence between the distance between the user's ear and the display screen of the mobile terminal and the volume adjustment ratio may be preset, and the required volume adjustment ratio is determined based on the distance, so that the output volume is better determined. In this way, user privacy is ensured while definition of the audio is ensured when the target phone receiver outputs the audio.

In the sound output control method provided by this embodiment of this disclosure, in the case of detecting that the current working state of the mobile terminal meets the preset condition for enabling sound output of the at least two phone receivers, the target phone receiver is determined from the at least two phone receivers, and the target phone receiver is controlled to enable the sound output function, so that blocking of the sound output hole on one side does not affect sound output quality during the sound output of the phone receiver, and that the problem that the volume decreases or even the sound quality deteriorates can be avoided.

Based on the foregoing method, an embodiment of this disclosure provides a mobile terminal for implementing the foregoing method.

Figure 3:
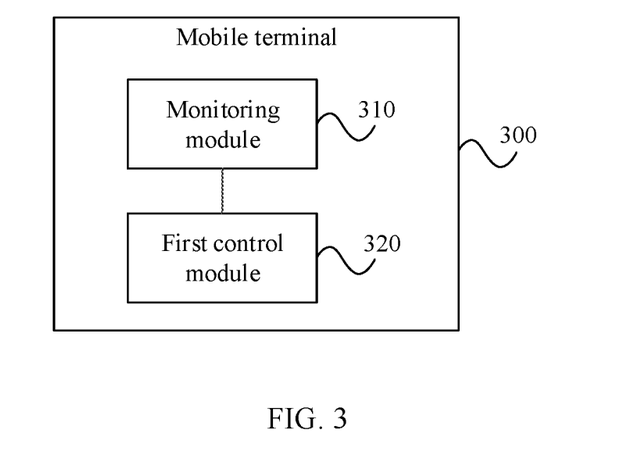
FIG. 3 presents a second schematic structural diagram of a mobile terminal according to an embodiment of this disclosure.

FIG. 3 is a second schematic structural diagram of a mobile terminal according to an embodiment of this disclosure. An embodiment of this disclosure provides a mobile terminal 300. The mobile terminal is the foregoing mobile terminal. The mobile terminal 300 may include a monitoring module 310 and a first control module 320.

The monitoring module 310 is configured to monitor a current working state of the mobile terminal.

The first control module 320 is configured to: in a case of detecting that the current working state meets a preset condition for enabling sound output of at least two phone receivers, determine a target phone receiver from the at least two phone receivers, and control the target phone receiver to enable a sound output function, where the current working state includes a preset event start state.

In some optional embodiments of this disclosure, the first control module 320 may include a detection submodule and a first determining submodule.

The detection submodule is configured to detect a holding posture of the mobile terminal.

The first determining submodule is configured to determine the target phone receiver from the at least two phone receivers based on a correspondence between the holding posture and the target phone receiver.

Specifically, in some optional embodiments of this disclosure, the first determining submodule may include a first determining unit and a second determining unit.

The first determining unit is configured to determine, based on the holding posture, a first target end of the sound output hole corresponding to the holding posture.

The second determining unit is configured to determine at least one phone receiver adjacent to the first target end as the target phone receiver.

The first target end of the sound output hole corresponding to the holding posture may be determined in a plurality of manners.

For example, in some optional embodiments of this disclosure, the first determining unit may include:

a first determining subunit, configured to determine, based on a correspondence between the holding posture and a prestored number of each end of the sound output hole, the first target end of the sound output hole corresponding to the holding posture;

or a second determining subunit, configured to determine a thumb holding position of a user's thumb on the mobile terminal; and a third determining subunit, configured to determine one end of the sound output hole further away from the thumb holding position as the first target end;

or a fourth determining subunit, configured to determine a pinna position of a user's ear; and a fifth determining subunit, configured to determine one end of the sound output hole further away from the pinna position as the first target end.

In addition, in some optional embodiments of this disclosure, two such display screens are provided, and the two display screens are disposed facing away from each other; and two such sound output holes are provided, each display screen is provided with one such sound output hole, and the at least two phone receivers are separately connected to each sound output hole by a sound conduction channel, where the first control module 320 may include a second determining submodule and a third determining submodule.

The second determining submodule is configured to determine a display screen close to a user's ear as a target display screen.

The third determining submodule is configured to determine the target phone receiver from the at least two phone receivers based on the target display screen and a holding posture of the mobile terminal.

Specifically, in some optional embodiments of this disclosure, the third determining submodule may include a third determining unit, a fourth determining unit, and a fifth determining unit.

The third determining unit is configured to determine a corresponding sound output hole on the target display screen as a target sound output hole.

The fourth determining unit is configured to determine, based on the holding posture, a second target end of the target sound output hole corresponding to the holding posture.

The fifth determining unit is configured to determine at least one phone receiver adjacent to the second target end as the target phone receiver.

In addition, in some optional embodiments of this disclosure, the mobile terminal 300 may further include a second control module.

The second control module is configured to control a sound conduction channel between the target phone receiver and the target sound output hole to be opened, and control a sound conduction channel between the target phone receiver and a sound output hole other than the target sound output hole to be closed.

In addition, in some optional embodiments of this disclosure, the first control module 320 may include a fourth determining submodule and a control submodule.

The fourth determining submodule is configured to determine the at least two phone receivers as target phone receivers.

The control submodule is configured to control the target phone receiver to enable the sound output function, and reduce output volume of the target phone receiver.

Specifically, in some optional embodiments of this disclosure, the control submodule may include an obtaining unit, a sixth determining unit, and a control unit.

The obtaining unit is configured to obtain a distance between a user's ear and the display screen of the mobile terminal.

The sixth determining unit is configured to determine, based on a preset correspondence between the distance and a volume adjustment ratio, the volume adjustment ratio corresponding to the distance.

The control unit is configured to reduce the output volume of the target phone receiver based on the volume adjustment ratio.

The mobile terminal provided by this embodiment of this disclosure can implement each process implemented by the mobile terminal in the method embodiment in FIG. 2. To avoid repetition, details are not described herein again.

The mobile terminal provided by this embodiment of this disclosure, in the case of detecting that the current working state of the mobile terminal meets the preset condition for enabling sound output of the at least two phone receivers, determines the target phone receiver from the at least two phone receivers, and controls the target phone receiver to enable the sound output function, so that blocking of the sound output hole on one side does not affect sound output quality during the sound output of the phone receiver, and that a problem that volume decreases or even sound quality deteriorates can be avoided.

Figure 4:
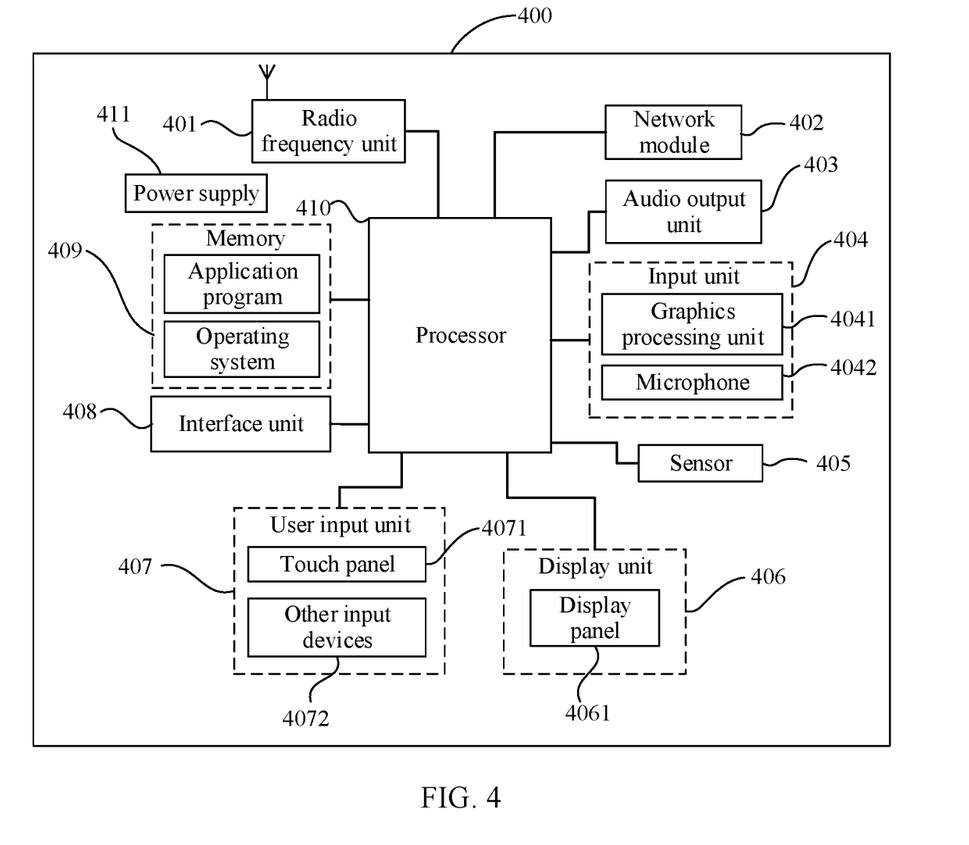
FIG. 4 is a schematic diagram of a hardware structure of a mobile terminal according to an embodiment of this disclosure.

FIG. 4 is a schematic diagram of a hardware structure of a mobile terminal for implementing each embodiment of this disclosure.

The mobile terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that the structure of the mobile terminal shown in FIG. 4 does not constitute any limitation on the mobile terminal, and the mobile terminal may include more or fewer components than those shown in the figure, or a combination of some components, or the components disposed differently. In this embodiment of this disclosure, the mobile terminal includes but is not limited to a mobile phone, a tablet computer, a laptop computer, a palmtop computer, an in-vehicle terminal, a wearable device, a pedometer, and the like.

It should be understood that in this embodiment of this disclosure, the radio frequency unit 401 may be configured to: receive and transmit signals in an information receiving/transmitting process or a call process; and specifically, after receiving downlink data from a base station, transmit the downlink data to the processor 410 for processing, and in addition, transmit uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and another device through a wireless communications system.

The mobile terminal provides the user with wireless broadband Internet access through the network module 402, for example, helping the user to send and receive e-mails, browse web pages, and access streaming media.

The audio output unit 403 may convert audio data received by the radio frequency unit 401 or the network module 402 or stored in the memory 409 into an audio signal, and output the audio signal as a sound. Furthermore, the audio output unit 403 may also provide audio output (for example, a call signal received sound or a message received sound) related to a specific function performed by the mobile terminal 400. The audio output unit 403 includes a speaker, a buzzer, a telephone receiver, and the like. In this embodiment of this disclosure, there are at least two phone receivers (earpieces), each of which is connected to a sound output hole by a sound conduction channel, where at least one phone receiver is disposed adjacently to a first end of the sound output hole, and at least one phone receiver is disposed adjacently to a second end of the sound output hole.

The processor 410 is configured to monitor a current working state of the mobile terminal; and in a case of detecting that the current working state meets a preset condition for enabling sound output of the at least two phone receivers, determine a target phone receiver from the at least two phone receivers, and control the target phone receiver to enable a sound output function, where the current working state includes a preset event start state.

In this embodiment of this disclosure, in the case of detecting that the current working state meets the preset condition for enabling sound output of the at least two phone receivers, the target phone receiver is determined from the at least two phone receivers, and the target phone receiver is controlled to enable the sound output function, so that blocking of the sound output hole on one side does not affect sound output quality during the sound output of the phone receiver, and that a problem that volume decreases or even sound quality deteriorates can be avoided.

The input unit 404 is configured to receive an audio or video signal. The input unit 404 may include a graphics processing unit (GPU) 4041 and a microphone 4042. The graphics processing unit 4041 processes image data of a still picture or a video obtained by an image capture apparatus (for example, a camera) in an image capture mode or a video capture mode. A processed image frame may be displayed on the display unit 406. An image frame processed by the graphics processing unit 4041 may be stored in the memory 409 (or another storage medium) or sent by the radio frequency unit 401 or the network module 402. The microphone 4042 can receive a sound and can process the sound into audio data. The processed audio data can be converted in a telephone call mode into a format that can be sent to a mobile communications base station through the radio frequency unit 401, for outputting.

The mobile terminal 400 may further include at least one sensor 405, for example, an optical sensor, a motion sensor, and another sensor. Specifically, the optical sensor may include an ambient light sensor and a proximity sensor. The ambient light sensor may adjust luminance of the display panel 4061 according to brightness of ambient light, and the proximity sensor may turn off the display panel 4061 and/or backlight when the mobile terminal 400 moves close to an ear. As a type of motion sensor, an accelerometer sensor can detect magnitudes of accelerations in all directions (usually three axes), can detect a magnitude and a direction of gravity when the mobile phone is in a static state, and can be applied to mobile terminal posture recognition (such as screen switching between portrait and landscape, related games, and magnetometer posture calibration), functions related to vibration recognition (such as pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided for the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information and generate key signal input related to user setting and function control of the mobile terminal. Specifically, the user input unit 407 includes a touch panel 4071 and other input devices 4072. The touch panel 4071, also referred to as a touchscreen, may capture a touch operation performed by the user on or near the touch panel (for example, an operation performed by the user on the touch panel 4071 or near the touch panel 4071 by using any appropriate object or accessory such as a finger or a stylus). The touch panel 4071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 4071 may be implemented in a plurality of forms, for example, a resistive, capacitive, infrared, or surface acoustic wave touch panel. The user input unit 407 may further include the other input devices 4072 in addition to the touch panel 4071. Specifically, the other input devices 4072 may include but are not limited to a physical keyboard, a function key (such as a volume control key or a power on/off key), a trackball, a mouse, a joystick, and the like. Details are not described herein.

Further, the touch panel 4071 may cover the display panel 4061. After the touch panel 4071 detects a touch operation on or near the touch panel, the touch panel 4071 transmits the touch operation to the processor 410 to determine a type of a touch event. Then the processor 410 provides a corresponding visual output on the display panel 4061 based on the type of the touch event. Although in FIG. 4, the touch panel 4071 and the display panel 4061 act as two independent parts to implement input and output functions of the mobile terminal, in some embodiments, the touch panel 4071 and the display panel 4061 may be integrated to implement the input and output functions of the mobile terminal. This is not specifically limited herein.

The interface unit 408 is an interface between an external apparatus and the mobile terminal 400. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 408 may be configured to receive an input (for example, data information or power) from an external apparatus and transmit the received input to one or more elements within the mobile terminal 400, or may be configured to transmit data between the mobile terminal 400 and the external apparatus.

The memory 409 may be configured to store a software program and various data. The memory 409 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 409 may include a high-speed random access memory, or may include a non-volatile memory, for example, at least one magnetic disk storage device, a flash memory, or other non-volatile solid-state storage devices.

The processor 410 is a control center of the mobile terminal, and is connected to all components of the mobile terminal by using various interfaces and lines. By running or executing a software program and/or module that is stored in the memory 409 and calling data stored in the memory 409, the processor 410 executes various functions of the mobile terminal and processes data, so as to perform overall monitoring on the mobile terminal. The processor 410 may include one or more processing units. Optionally, the processor 410 may integrate an application processor and a modem processor. The application processor mainly processes the operating system, a user interface, an application program, and the like. The modem processor mainly processes wireless communication. It may be understood that the modem processor may alternatively not be integrated into the processor 410.

The mobile terminal 400 may further include a power supply 411 (such as a battery) that supplies power to components. Optionally, the power supply 411 may be logically connected to the processor 410 through a power management system. In this way, functions such as charge management, discharge management, and power consumption management are implemented by using the power management system.

In addition, the mobile terminal 400 includes some functional modules that are not shown. Details are not described herein.

Optionally, an embodiment of this disclosure further provides a mobile terminal, including: a processor 410, a memory 409, and a computer program stored in the memory 409 and capable of running on the processor 410. When the computer program is executed by the processor 410, the procedures in the foregoing embodiments of the sound output control method are implemented, with the same technical effect achieved. To avoid repetition, details are not described herein again.

An embodiment of this disclosure further provides a computer-readable storage medium, where the computer-readable storage medium stores a computer program. When the computer program is executed by a processor, each process of the foregoing embodiment of the sound output control method is implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art may be embodied in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

It may be understood that the embodiments described in the embodiments of this disclosure may be implemented by hardware, software, firmware, middleware, microcode, or a combination thereof. For hardware implementation, the module, unit, or subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the scope of this disclosure.

What is claimed is:

1. A sound output control method, comprising:
providing a mobile terminal comprising a first display screen and a second display screen, the first display screen and the second display screen being disposed facing away from each other, the mobile terminal further comprising:
  a first sound output hole and a second sound output hole which are strip-shaped, the first sound output hole being disposed at a top edge of the first display screen, and the second sound output hole being disposed at a top edge of the second display screen;
  at least two phone receivers comprising a first phone receiver and a second phone receiver;
  a photosensitive module, located between the first phone receiver and the second phone receiver;
  wherein the first phone receiver is disposed adjacently to a first end of the first sound output hole and a first end of the second sound output hole, and the second phone receiver is disposed adjacently to a second end of the first sound output hole and a second end of the second sound output hole; and
  the first sound output hole is connected to the first phone receiver and the second phone receiver by corresponding sound conduction channels, and the second sound output hole is connected to the first phone receiver and the second phone receiver by corresponding sound conduction channels, the first sound output hole and the second sound output hole share the first receiver and the second receiver;
  a baffle is disposed on each of the sound conduction channels connected to the first sound output hole, and a baffle is disposed on each of the sound conduction channels connected to the second sound output hole, to cause each sound conduction channel to be opened or closed separately;
monitoring, by the mobile terminal, a current working state of the mobile terminal; and
in a case of detecting that the current working state meets a preset condition for enabling sound output of the at least two phone receivers, determining, by the mobile terminal, a target phone receiver from the at least two phone receivers, comprising:
  determining, from the first display screen and the second display screen, a display screen close to a user's ear as a target display screen; and
  determining at least one target phone receiver from the at least two phone receivers based on the target display screen and a holding posture of the mobile terminal; and
controlling, by the mobile terminal, the target phone receiver to enable a sound output function, wherein the current working state comprises a preset event start state;
wherein in accordance with a determination that the first phone receiver and the second phone receiver are the at least one target phone receiver, the controlling, by the mobile terminal, the at least one target phone receiver to enable a sound output function comprises:
controlling both the first phone receiver and the second phone receiver to enable the sound output function, and reducing output volume of the first phone receiver and output volume of the second phone receiver.

2. The control method according to claim 1, wherein the determining at least one target phone receiver from the at least two phone receivers based on the target display screen and a holding posture of the mobile terminal comprises:

detecting the holding posture of the mobile terminal; and in accordance with a determination that one of the first phone receiver and the second phone receiver is the at least one target phone receiver, determining the at least one target phone receiver from the at least two phone receivers based on a correspondence between the holding posture and the target phone receiver.

3. The control method according to claim 2, wherein the determining the at least one target phone receiver from the at least two phone receivers based on a correspondence between the holding posture and the at least one target phone receiver comprises:

determining, based on the holding posture, a first target end of the first sound output hole or the second sound output hole corresponding to the holding posture; and determining one of the first phone receiver and the second phone receiver that is adjacent to the first target end as the at least one target phone receiver.

4. The control method according to claim 3, wherein the determining, based on the holding posture, a first target end of the first sound output hole or the second sound output hole corresponding to the holding posture comprises:

determining, based on a correspondence between the holding posture and a prestored number of each end of the first sound output hole or the second sound output hole, the first target end of the first sound output hole or the second sound output hole corresponding to the holding posture;

or determining a thumb holding position of a user's thumb on the mobile terminal; and determining one end of the first sound output hole or the second sound output hole further away from the thumb holding position as the first target end;

or determining a pinna position of a user's ear; and determining one end of the first sound output hole or the second sound output hole further away from the pinna position as the first target end.

5. The control method according to claim 1, wherein the determining the at least one target phone receiver from the at least two phone receivers based on the target display screen and a holding posture of the mobile terminal comprises:

determining a corresponding sound output hole on the target display screen as a target sound output hole;

determining, based on the holding posture, a second target end of the target sound output hole corresponding to the holding posture; and in accordance with a determination that one of the first phone receiver and the second phone receiver is the at least one target phone receiver, determining one of the first phone receiver and the second phone receiver that is adjacent to the second target end as the at least one target phone receiver.

6. The control method according to claim 5, wherein the method further comprises:

controlling a sound conduction channel between the determined at least one target phone receiver and the target sound output hole to be opened, and controlling a sound conduction channel between the determined at least one target phone receiver and a sound output hole other than the target sound output hole to be closed.

7. The control method according to claim 1, wherein the reducing output volume of the first phone receiver and output volume of the second phone receiver comprises:

obtaining a distance between a user's ear and the first display screen or the second display screen of the mobile terminal;

determining, based on a preset correspondence between the distance and a volume adjustment ratio, the volume adjustment ratio corresponding to the distance; and reducing the output volume of the first phone receiver and the output volume of the second phone receiver based on the volume adjustment ratio.

8. A mobile terminal, comprising:

a first display screen and a second display screen, the first display screen and the second display screen being disposed facing away from each other;

a first sound output hole and a second sound output hole which are strip-shaped, the first sound output hole being disposed at a top edge of the first display screen, and the second sound output hole being disposed at a top edge of the second display screen;

at least two phone receivers comprising a first phone receiver and a second phone receiver; and a photosensitive module, located between the first phone receiver and the second phone receiver;

wherein the first phone receiver is disposed adjacently to a first end of the first sound output hole and a first end of the second sound output hole, and the second phone receiver is disposed adjacently to a second end of the first sound output hole and a second end of the second sound output hole; and the first sound output hole is connected to the first phone receiver and the second phone receiver by corresponding sound conduction channels, and the second sound output hole is connected to the first phone receiver and the second phone receiver by corresponding sound conduction channels, the first sound output hole and the second sound output hole share the first receiver and the second receiver;

a baffle is disposed on each of the sound conduction channels connected to the first sound output hole, and a baffle is disposed on each of the sound conduction channels connected to the second sound output hole, to cause each sound conduction channel to be opened or closed separately;

wherein the mobile terminal further comprises a processor, a memory, and a computer program stored in the memory and capable of running on the processor, wherein when the computer program is executed by the processor, a sound output control method is implemented, and the method comprises:

monitoring a current working state of the mobile terminal; and in a case of detecting that the current working state meets a preset condition for enabling sound output of the at least two phone receivers, determining a target phone receiver from the at least two phone receivers, comprising:

determining a display screen close to a user's ear as a target display screen; and determining at least one target phone receiver from the at least two phone receivers based on the target display screen and a holding posture of the mobile terminal; and controlling the at least one target phone receiver to enable a sound output function, wherein the current working state comprises a preset event start state;

wherein in accordance with a determination that the first phone receiver and the second phone receiver are the at least one target phone receiver, the controlling the at least one target phone receiver to enable a sound output function comprises:
controlling both the first phone receiver and the second phone receiver to enable the sound output function, and reducing output volume of the first phone receiver and output volume of the second phone receiver.

9. The mobile terminal according to claim 8, wherein the determining at least one target phone receiver from the at least two phone receivers based on the target display screen and a holding posture of the mobile terminal comprises:
detecting a holding posture of the mobile terminal; and
in accordance with a determination that one of the first phone receiver and the second phone receiver is the at least one target phone receiver, determining the at least one target phone receiver from the at least two phone receivers based on a correspondence between the holding posture and the target phone receiver.

10. The mobile terminal according to claim 9, wherein the determining the at least one target phone receiver from the at least two phone receivers based on a correspondence between the holding posture and the at least one target phone receiver comprises:
determining, based on the holding posture, a first target end of the first sound output hole or the second sound output hole corresponding to the holding posture; and
determining one of the first phone receiver and the second hone receiver that is adjacent to the first target end as the at least one target phone receiver.

11. The mobile terminal according to claim 10, wherein the determining, based on the holding posture, a first target end of the first sound output hole or the second sound output hole corresponding to the holding posture comprises:
determining, based on a correspondence between the holding posture and a prestored number of each end of the first sound output hole or the second sound output hole, the first target end of the first sound output hole or the second sound output hole corresponding to the holding posture;
or
determining a thumb holding position of a user's thumb on the mobile terminal; and
determining one end of the first sound output hole or the second sound output hole further away from the thumb holding position as the first target end;

or
determining a pinna position of a user's ear; and
determining one end of the first sound output hole or the second sound output hole further away from the pinna position as the first target end.

12. The mobile terminal according to claim 8, wherein the determining the at least one target phone receiver from the at least two phone receivers based on the target display screen and a holding posture of the mobile terminal comprises:
determining a corresponding sound output hole on the target display screen as a target sound output hole;
determining, based on the holding posture, a second target end of the target sound output hole corresponding to the holding posture; and
in accordance with a determination that one of the first phone receiver and the second phone receiver is the at least one target phone receiver, determining one of the first phone receiver and the second phone receiver that is adjacent to the second target end as the at least one target phone receiver.

13. The mobile terminal according to claim 12, wherein the method further comprises:
controlling a sound conduction channel between the determined at least one target phone receiver and the target sound output hole to be opened, and controlling a sound conduction channel between the determined at least one target phone receiver and a sound output hole other than the target sound output hole to be closed.

14. The mobile terminal according to claim 8, wherein the reducing output volume of the first phone receiver and output volume of the second phone receiver comprises:
obtaining a distance between a user's ear and the first display screen or the second display screen of the mobile terminal;
determining, based on a preset correspondence between the distance and a volume adjustment ratio, the volume adjustment ratio corresponding to the distance; and
reducing the output volume of the first phone receiver and the output volume of the second phone receiver based on the volume adjustment ratio.

* * * * *